(12) United States Patent
Duane et al.

(10) Patent No.: US 8,370,638 B2
(45) Date of Patent: Feb. 5, 2013

(54) DERIVATIVE SEEDS

(75) Inventors: William Duane, Westford, MA (US);
Jeffrey Hamel, Methuen, MA (US)

(73) Assignee: EMC Corporation, Hopkinton, MA (US)

( * ) Notice: Subject to any disclaimer, the term of this patent is extended or adjusted under 35 U.S.C. 154(b) by 1260 days.

(21) Appl. No.: 11/357,724

(22) Filed: Feb. 17, 2006

(65) Prior Publication Data

US 2007/0174614 A1    Jul. 26, 2007

Related U.S. Application Data

(60) Provisional application No. 60/654,108, filed on Feb. 18, 2005, provisional application No. 60/668,680, filed on Apr. 6, 2005.

(51) Int. Cl.
*H04L 29/06* (2006.01)
*H04L 9/32* (2006.01)

(52) U.S. Cl. ........ 713/185; 713/150; 713/155; 713/159; 713/168; 713/169; 726/2; 726/3; 726/4; 726/9; 726/20; 726/26; 380/249; 380/270; 380/274; 709/227; 709/229; 709/230; 709/237; 705/65; 705/66; 705/67

(58) Field of Classification Search .................... 713/185
See application file for complete search history.

(56) References Cited

U.S. PATENT DOCUMENTS

| | | | |
|---|---|---|---|
| 4,104,694 A | 8/1978 | Hargrove | |
| 4,145,568 A | 3/1979 | Ehrat et al. | |
| 4,145,569 A | 3/1979 | Ehrat et al. | |
| 4,238,854 A | 12/1980 | Ehrsam et al. | |
| 4,317,957 A | 3/1982 | Sendrow | |
| 4,320,387 A | 3/1982 | Powell | |
| 4,369,332 A | 1/1983 | Campbell, Jr. | |
| 4,438,824 A | 3/1984 | Mueller-Schloer | |
| 4,471,216 A | 9/1984 | Herve et al. | |
| 4,509,093 A | 4/1985 | Stellberger et al. | |
| 4,536,647 A | 8/1985 | Atalla et al. | |
| 4,543,657 A | 9/1985 | Wilkinson et al. | |
| 4,575,621 A | 3/1986 | Dreifus | |
| 4,578,530 A | 3/1986 | Zeidler | |
| 4,582,434 A | 4/1986 | Plangger et al. | |
| 4,599,489 A | 7/1986 | Cargile | |

(Continued)

FOREIGN PATENT DOCUMENTS

| | | |
|---|---|---|
| EP | 0140013 | 5/1985 |
| EP | 0148960 | 7/1985 |

(Continued)

OTHER PUBLICATIONS

Safenet Inc., 'MobilePASS Version 8.2 Software Authentication Solutions Security Features', Safenet, Inc, 2008, entire document, http://www.audema.net/website/images/stories/soluciones/safenet/news/Mobilepass8_2_Security_Features_final.pdf.*

(Continued)

*Primary Examiner* — Edan Orgad
*Assistant Examiner* — Ronald Baum
(74) *Attorney, Agent, or Firm* — BainwoodHuang

(57) ABSTRACT

A method of generating authentication seeds for a plurality of users, the method involving: based on a single master seed, generating a plurality of derivative seeds, each one for a corresponding different one of a plurality of users; and distributing the plurality of derivative seeds to a verifier for use in individually authenticating each of the plurality of users to that verifier, wherein generating each one of the plurality of derivative seeds involves mathematically combining the master seed and a unique identifier identifying the corresponding user.

11 Claims, 2 Drawing Sheets

U.S. PATENT DOCUMENTS

| | | | |
|---|---|---|---|
| 4,605,820 | A | 8/1986 | Campbell, Jr. |
| 4,609,777 | A | 9/1986 | Cargile |
| 4,614,861 | A | 9/1986 | Pavlov et al. |
| 4,720,860 | A | 1/1988 | Weiss |
| 4,731,841 | A | 3/1988 | Rosen et al. |
| 4,800,590 | A | 1/1989 | Vaughan |
| 4,819,267 | A | 4/1989 | Cargile et al. |
| 4,849,613 | A | 7/1989 | Eisele et al. |
| 4,856,062 | A | 8/1989 | Weiss |
| 4,885,778 | A | 12/1989 | Weiss |
| 4,890,323 | A | 12/1989 | Beker et al. |
| 4,928,098 | A | 5/1990 | Dannhaeuser et al. |
| 4,933,971 | A | 6/1990 | Bestock et al. |
| 4,944,008 | A | 7/1990 | Piosenka et al. |
| 4,998,279 | A | 3/1991 | Weiss |
| 5,016,276 | A | 5/1991 | Matumoto et al. |
| 5,023,908 | A | 6/1991 | Weiss |
| 5,046,125 | A | 9/1991 | Takizawa et al. |
| 5,058,161 | A | 10/1991 | Weiss |
| 5,097,505 | A | 3/1992 | Weiss |
| 5,101,430 | A | 3/1992 | Periou et al. |
| 5,168,520 | A | 12/1992 | Weiss |
| 5,180,902 | A | 1/1993 | Shick et al. |
| 5,202,921 | A * | 4/1993 | Herzberg et al. ............. 713/162 |
| 5,206,905 | A | 4/1993 | Lee et al. |
| 5,237,614 | A | 8/1993 | Weiss |
| 5,253,295 | A | 10/1993 | Saada et al. |
| 5,280,527 | A | 1/1994 | Gullman et al. |
| 5,347,580 | A | 9/1994 | Molva et al. |
| 5,361,062 | A | 11/1994 | Weiss et al. |
| 5,367,572 | A | 11/1994 | Weiss |
| 5,479,512 | A | 12/1995 | Weiss |
| 5,485,519 | A | 1/1996 | Weiss |
| 5,513,263 | A | 4/1996 | White et al. |
| 5,539,824 | A | 7/1996 | Bjorklund et al. |
| 5,592,553 | A | 1/1997 | Guski et al. |
| 5,655,077 | A | 8/1997 | Jones et al. |
| 5,657,388 | A | 8/1997 | Weiss |
| 5,717,756 | A | 2/1998 | Coleman |
| 5,732,133 | A | 3/1998 | Mark |
| 5,734,720 | A | 3/1998 | Salganicoff |
| 5,737,421 | A | 4/1998 | Audebert et al. |
| 5,745,576 | A | 4/1998 | Abraham et al. |
| 5,748,734 | A | 5/1998 | Mizikovsky |
| 5,779,545 | A | 7/1998 | Berg et al. |
| 5,802,176 | A | 9/1998 | Audebert et al. |
| 5,841,864 | A | 11/1998 | Klayman et al. |
| 5,841,866 | A | 11/1998 | Bruwer et al. |
| 5,887,065 | A | 3/1999 | Audebert |
| 5,937,068 | A | 8/1999 | Audebert |
| 6,078,888 | A | 6/2000 | Johnson, Jr. |
| 6,141,760 | A | 10/2000 | Abadi et al. |
| 6,266,413 | B1 | 7/2001 | Shefi |
| 6,295,359 | B1 | 9/2001 | Cordery et al. |
| 6,307,938 | B1 | 10/2001 | Matyas, Jr. et al. |
| 6,338,140 | B1 | 1/2002 | Owens et al. |
| 6,345,098 | B1 | 2/2002 | Matyas, Jr. et al. |
| 6,538,761 | B1 * | 3/2003 | Yokono et al. ............... 358/1.15 |
| 6,687,375 | B1 * | 2/2004 | Matyas et al. .................. 380/45 |
| 6,915,434 | B1 | 7/2005 | Kuroda et al. |
| 6,985,583 | B1 | 1/2006 | Brainard et al. |
| 7,328,350 | B2 * | 2/2008 | Hird .............................. 713/183 |
| 7,359,507 | B2 | 4/2008 | Kaliski |
| 7,953,974 | B2 * | 5/2011 | Yamamura et al. ........... 713/168 |
| 2002/0026427 | A1 * | 2/2002 | Kon et al. ....................... 705/67 |
| 2002/0129250 | A1 * | 9/2002 | Kimura ......................... 713/172 |
| 2002/0164026 | A1 * | 11/2002 | Huima ......................... 380/247 |
| 2003/0041244 | A1 * | 2/2003 | Buttyan et al. ................ 713/172 |
| 2003/0145203 | A1 | 7/2003 | Audebert et al. |
| 2005/0283444 | A1 * | 12/2005 | Ekberg ............................ 705/67 |
| 2006/0136739 | A1 * | 6/2006 | Brock et al. .................. 713/184 |
| 2006/0256961 | A1 | 11/2006 | Brainard et al. |
| 2008/0244720 | A1 * | 10/2008 | Bartsch et al. ..................... 726/9 |

FOREIGN PATENT DOCUMENTS

| | | |
|---|---|---|
| EP | 0566811 | 10/1993 |
| EP | 0678836 | 10/1995 |
| EP | 0848315 A2 | 6/1998 |
| EP | 1 050 789 | 11/2000 |
| FR | 2607544 | 6/1988 |
| JP | 59119630 | 7/1984 |
| JP | 2835433 | 12/1998 |
| JP | 2884338 | 4/1999 |
| JP | 2001-523064 | 11/2001 |
| WO | WO 8806826 | 9/1988 |
| WO | 99/25086 | 5/1999 |
| WO | WO 0223367 A1 * | 3/2002 |

OTHER PUBLICATIONS

Rankl, W., "Handbuch der Chipkarten", 2002, Hanser-Verlag, Munchen 050428, XP002389992, pp. 203-210.

International Search Report of PCT/US2006/005606, mailed Aug. 1, 2006, 3 pages, European Patent Office.

American National Standard for Financial Services. "Financial Services Key Management Using the DEA," American Bankers Association, copyright 1992, 1999, pp. i-iii, 1-9, 34-52.

Abdalla., et al., "One-time Verifier Based on Encrypted Key Exchange," Lawrence Berkeley National Lab., Springer-Verlag 2004-205, entire document.

European Patent Office, European Search Report, International Application EP 00303741, date of completion of search Jan. 16, 2002, 2 pages.

Ferreira, "The Smart Card: A High Security Tool in EDP," Philips Telecommunications and Data Systems Review, Philips Telecommunicatie Industrie N. V. Hilversum, NL, Sep. 1989, vol. 47, No. 3, pp. 1-19.

FIPS Publ. 190, "Guideline for the Use of Advanced Authentication Technology Alternatives," Sep. 28, 1994; section 4; Section 4.4.2.1.

Freier et al., The SSL Protocol, Version 3.0, http://home.netscape.com/eng/ssl3/3-SPEC.htm, Mar. 1996, pp. 1-26, and Table of Contents, http://home.netscape.com/eng/ssl3/ssl-toc.html, pp. 1-3.

Kim, Y., et al., "Secure Authentication System that Generates Seed from Biometic Information," Feb. 10, 2005, Optical Society of America, Applied Optics, vol. 44, No. 5.

RSA Laboratories, a division of RSA Data Securuity Inc. "PKCS #5 v2.0: Password-Based Cryptography Standard," Mar. 25, 1999, copyright 1991-1999, pp. 1-30.

Shamir, "Identity-Based Cryptosystems and Signature Schemes," Lecture Notes in Computer Science, Springer Verlag, New York, NY, US, 1985, pp. 47-53.

Standard Specifications for Public Key Cryptography, IEEE P 1363/D 13 (Draft Version 13), Institute of Electrical and Electronics Engineers, Inc., New York, NY, Nov. 12, 1999, pp. 1, 4-6, 53-57, 71-73.

Office Action from JP2007-556314, drafted Sep. 6, 2010, 8 pages.

* cited by examiner

DERIVATIVE SEEDS

This application claims the benefit of U.S. Provisional Application Nos. 60/654,108, filed Feb. 18, 2005, and 60/668,680, filed Apr. 6, 2005, both of which are incorporated herein by reference.

TECHNICAL FIELD

This invention relates to the field of computer-based security systems and, more particularly, to the distribution of authentication secrets.

BACKGROUND OF THE INVENTION

In security systems, verifiers are used to authenticate, that is to verify the identity of, a person or other entity such as a computer. Typically an entity requesting authentication asserts their identity to the verifier, for example by entering a user ID. The entity then typically supplies some additional information which should only be knowable to the valid entity. The verifier determines if the information supplied by the entity matches the information that the valid entity would supply. When an entity has been authenticated, meaning that the verifier has confirmed that the identity of the entity is as the entity claims, the entity is allowed access, for example physical access to a physical location, in the case of a physical security system, or electronic access to a resource or information (e.g. financial records, computer data, network access, etc.), in data security systems.

There are many possible configurations for verifiers. Verifiers can receive input from keypads, keyboards, card readers, cameras, microphones, telephone and computer networks, and other such data input devices. As output, verifiers activate physical mechanisms, send electronic data signals, configure software, or take such other action to provide access. Verifiers can be implemented in various ways, for example as special purpose electronic and/or mechanical systems, or as general-purpose computers, possibly, but not necessarily, in electrical communication with special-purpose hardware.

Some verifiers use knowledge or possession of a shared secret to authenticate an entity. The secret is "shared" because it is held by both the verifier and the entity being authenticated. For example, knowledge or possession of a personal identification number, password, or pass phrase can be used to verify an entity. At the time that authentication takes place, the entity either reveals the secret or otherwise proves knowledge or possession of the secret. If the entity shows knowledge or possession of the secret as required by the particular authentication system, the entity is authenticated.

In some systems, an entity uses a physical or digital device, referred to as a token, that incorporates a secret. The secret, stored in some manner in the device, may or may not be known to the entity using the device.

To prove knowledge of a secret contained within the device, some devices provide an authentication code that is based upon, but different from, the secret code contained within the device. The use of such an authentication code allows the device to show knowledge of a secret without revealing it. In some systems, the authentication code is based on time-dependent information. The use of this sort of device has security benefits in that the secret is more difficult to determine by eavesdropping in the communications channel between the entity and the verifier, since the secret itself is not revealed.

One example of this sort of device used by a person to authenticate to a verifier is a token that includes an authentication code display. The person reads an authentication code from the display, and transmits the authentication code to the verifier. In such a system, the user may never know the shared secret. Some such tokens accept user input, such as a PIN, and provide a result in response to the user input as well as other information (such as time-dependent information). One disadvantage with these token devices is that only one user can use the token to authenticate to the verifier. Each user must have his or her own token.

One token of this type stores a secret code, referred to as a seed, and mathematically combines the secret code with a time-varying value and a personal identification code provided by the user to generate an authentication code. The mathematical combination takes place in such a way that the secret code stored in the token cannot be determined from the result—the secret code is combined cryptographically with the current time and other information. In another system that is a challenge-response system, meaning that the verifier transmits a challenge for the user to respond to, the secret code is cryptographically combined with the challenge to produce an output that is sent to the verifier as a response to the challenge.

To verify an entity using a shared secret, the verifier needs to have knowledge of the shared secret. In a security system that verifies a large number of entities, there is a tradeoff between security and verifier availability. If there are a large number of verifiers, there is more likely to be a verifier available when a particular entity requires authentication. However, as the number of verifiers that have knowledge of a secret increases, it becomes increasingly more difficult to maintain the security of the system.

The utility of a security system is limited by the number and variety of verifiers to which an entity can conveniently authenticate. If the entity interacts with a number of verifiers that share different secrets with that entity, the entity will have to manage a number of secrets (or devices containing secrets), where each secret is used to authenticate to one or small number of verifiers. Managing a large number of secrets adds complexity to a computer-based entity, and is inconvenient for a human entity. Even the process of securely sharing a different secret between an entity and each of a large number of verifiers can be inconvenient and cumbersome.

Public key cryptography can be used to avoid the need to securely share a secret between each two parties that wish to communicate or authenticate. However, public-key cryptography is impractical in many user and device authentication settings, at least partly because of the large computation power required to accomplish the calculations, and the complexity of managing certificates and revocation lists.

SUMMARY OF THE INVENTION

In general, the invention is a system whereby a single shared secret can be used as the basis to derive a plurality of shared secrets to be used for authentication. The process of deriving the shared secrets can occur dynamically, in some cases at the time of authentication. One particular value of this derived secret model is that a single authentication device, containing the initial shared secret can be distributed without the need for pre-computing all possible derived secret values in advance. This significantly simplifies the process of distributing and using a single authentication device in multiple environments. Another value of this system is that the initial shared secret may never be used for authentication (only for secret derivation), increasing the security of the system. Yet another value of this system is to allow a single authenticator (i.e. token) to be used by multiple parties, or used by a single party to authenticate to multiple entities, or both used by multiple parties to authenticate to multiple entities, without using a common shared secret for these authentications. In this case, all authentications will occur using a shared secret unique to each situation; where each unique shared secret is derived from the initial shared secret.

In one aspect, the invention features a method for generating authentication secrets (e.g. "seeds") for a plurality of client-side entities. The method involves: based on a single master seed, generating a plurality of derivative seeds, each one for a corresponding different one of a plurality of client-side entities, wherein generating each one of the plurality of derivative seeds involves mathematically combining the master seed and a unique identifier identifying the corresponding client-side entity. In certain embodiments, the invention may also be used to generate authentication seeds for a plurality of server-side entities.

Other embodiments include one or more of the following features. The plurality of client-side entities is a plurality of users. The method also involves distributing the plurality of derivative seeds to a verifier for use in individually authenticating each of the plurality of client-side entities to that verifier. The following is an overview of one embodiment of the method of the present invention using a derivative seed to authenticate a user to an authentication server. First, a master seed generator creates the master seed. The master seed is loaded into the authenticator which may be used by multiple users to authenticate. The authenticator may be a token implemented as a hardware device or in software. The master seed is also loaded into the derived seed generator. At some later time, typically during a registration process to enable the authentication of a particular user using the authenticator, the following steps are performed: (1) the authentication server obtains the unique identifier (UID) for the user; (2) the authentication server contacts the derived seed generator supplying the user's UID and identifies which authenticator will be used by user (e.g. by supplying the authenticator serial number); (3) the derived seed generator uses the authenticator's serial number to locate the master seed which was loaded into authenticator, and then cryptographically combines the master seed and the user UID to create the derived Seed; and (4) the derived seed is sent back to the authentication server to be used as the shared secret for subsequent authentications. The master seed generator may be logically separate from the derived seed generator, or the two generators may be implemented as a single generator that performs both functions. At some yet later time, the user will decide to access some resource protected by the authentication server and the following steps will be performed: (1) the user UID will be passed to the authenticator at the time of the authentication; (2) internally, the authenticator will cryptographically combine the previously stored master seed, with the newly supplied user UID, and thereby dynamically create the derived seed; and (3) using the derived seed, the authenticator will execute one of a number of authentication algorithms using the derived seed as the shared secret, and release the appropriate authentication code. The authentication code will then be sent to the authentication server. Since the authentication server already has a stored copy of derived seed, it can validate the authentication code.

A number of different users, each with their own unique UID can use the same process which will derive a derived seed unique to that combination of user and authenticator. As a result, the resulting system has a number of unique properties. First, a single master seed is the only static secret which needs to be stored in the authenticator. Second, each user will have a unique user UID and therefore a unique derived seed. Each user's unique derived seed can be created dynamically at the time of authentication, and therefore there is no need it store the derived seed for a user in the authenticator. This is valuable from both a security and a memory utilization point of view. However, the derived seed may also be precomputed and stored in the authenticator. Each unique derived seed is used to authenticate each unique user, and as a result there is no sharing of a common authentication secret; and therefore no security vulnerability introduced by secret sharing. Finally, because derived seeds can be generated dynamically at the time of authentication and are not necessarily stored in the authenticator, there is no limit to the number of users who can share a common authenticator.

In general, in another aspect, the invention features a method of using a single master seed to authenticate any selectable one of a plurality of client-side entities to a verifier, wherein each of the plurality of client-side entities is identified by a different unique identifier. The method involves: mathematically combining the master seed with the unique identifier for the any selectable client-side entity to generate a derivative seed for the any selectable client-side entity; and using the derivative seed that was generated for the any selectable client-side entity to authenticate the any selectable client-side entity to the verifier.

Other embodiments include one or more of the following features. The plurality of client-side entities is a plurality of users. Using the derivative seed for the any selectable user involves sending to the verifier a value that is computed from the derivative seed for the any selectable user. Using the derivative seed that was generated for the any selectable client-side entity to authenticate that any selectable client-side entity to the verifier involves using an authentication algorithm selected from the group consisting of a time-based authentication algorithm, a challenge-response authentication algorithm, a counter-based authentication algorithm, and an event synchronous authentication algorithm. Mathematically combining the master seed with the unique identifier for the any selectable client-side entity involves using an authentication algorithm based on a shared secret. Examples of algorithms that utilize shared secretes include: a hash function, a block cipher function, a stream cipher function and a message authentication code function. These are just examples of algorithms that may be used. Any other algorithm that utilizes a shared secret may also be used. Mathematically combining may involve using a key derivation function. The key derivation function may include an iterative function. The key derivation function takes as inputs the master seed or a value previously derived from the master seed and one or more unique identifiers from a plurality of unique identifiers, one of which may include unique identifiers identifying the plurality of users.

In general, in still another aspect, the invention features a method of generating authentication seeds for one or more client-side entities to enable them to individually authenticate to one or more server-side entities. The method involves from a single master seed, generating a plurality of derivative seeds, wherein generating each one of the plurality of derivative seeds involves mathematically combining the master seed with a corresponding different plurality of unique identifiers, each unique identifier of the corresponding different plurality of unique identifiers identifying a different entity.

Other embodiments include one or more of the following features. The method also involves distributing the plurality of derivative seeds to the one or more server-side entities to enable a user to authenticate to those one or more server-side entities by using an appropriate one of the plurality of derivative seeds. That is, the derivative seeds may be based upon a combination of user unique identifiers and server unique identifiers, each user and server having a unique identifier value. The one or more server-side entities is a plurality of server-side entities, wherein at least one of the unique identifiers of each corresponding different plurality of identifiers identifies a corresponding different server-side entity user among the plurality of server-side entities. Mathematically combining involves using a key derivation function. The key derivation function includes an iterative function. The key derivation function takes as inputs the master seed or a value previously derived from the master seed and one or more unique identifiers from a plurality of unique identifiers, one of which may include unique identifiers identifying the plurality of users.

In general, in still yet another aspect the invention features a method implemented in a token for authenticating a plurality of different users to another entity. The method involves: storing a master seed in the token; when any one of the users seeks to authenticate to the other entity, (1) mathematically combining the master seed with a unique identifier supplied for that user to generate a derivative seed for that user; and (2) using the derivative seed for that user to authenticate to the other entity. While the method has been described for a plurality of users authenticating to another entity, it should be understood that the method may be used for any type of entity authenticating to another entity.

Other embodiments include one or more of the following features. Using the derivative seed for that user to authenticate to the other entity involves using an authentication algorithm which utilizes a shared secret. Examples of algorithms include: a time-based authentication algorithm, a challenge-response authentication algorithm, a counter-based authentication algorithm, and an event synchronous authentication algorithm. In other embodiments, the method also involves erasing the derivative seed for that user after authenticating that user to the other entity. However, this step is not required.

In still yet another aspect, the invention features a method for use in a network in which a user having a user device that stores a master seed authenticates through a client-side device to another entity on the network. The method involves: in a server connected to the network, receiving from the client-side device a unique identifier identifying the client-side device; in the server, mathematically combining a secret with the unique identifier for the client device to generate a derivative seed, wherein the secret is derived from the master seed or a previously generated derived seed; and sending the newly derived seed from the server to the client-side device.

Other embodiments include one or more of the following features. The method also involves, at the client-side device: receiving the derivative seed; and after receiving the derivative seed, disconnecting the client-side device from the network. And it also involves: in the user device: receiving the unique identifier for the client-side device; mathematically combining at least the unique identifier with the master seed to generate the derivative seed; and using the derivative seed to authenticate to the client-side device while the client-side device is disconnected from the network. The master seed is the shared secret. Alternatively, the secret is a seed previously derived from the master seed, that is, it is generated by mathematically combining the master seed with one or more other identifiers.

In general, in yet another aspect, the invention features a method implemented by a client-side device on a network in which a user authenticates through the client-side device to another entity on the network. The method involves: sending to the other entity of the network a unique identifier identifying the client-side device; receiving from the other entity a derivative seed, wherein the derivative seed was generated by mathematically combining a secret with the unique identifier for the client-side device, wherein the secret is based on the master seed; disconnecting from the network; to authenticate a user, sending the unique identifier for the client-side device to a user device; after sending the unique identifier for the client-side device to the user device, receiving information from the user device indicating that user device knows derivative seed, such as an authentication code computed from or based on the resulting derivative seed.

In general, in still yet another aspect, the invention features a method of authenticating a plurality of users at a server site. The method involves: storing a plurality of derived seeds that are all computed from a single master seed, wherein each one of the plurality of derived seeds is for a corresponding different one of the plurality of users, wherein each derived seed of the plurality of seeds is generated by mathematically combining the master seed with a unique identifier for the corresponding user; for any selected one of the plurality of users, receiving authentication information from that user that is mathematically generated from the derived seed for that user; and for that selected user, authenticating that user based on the authentication information received from that user. In other embodiments, the method can be used to authenticate any type of entity (not just users) to another entity.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
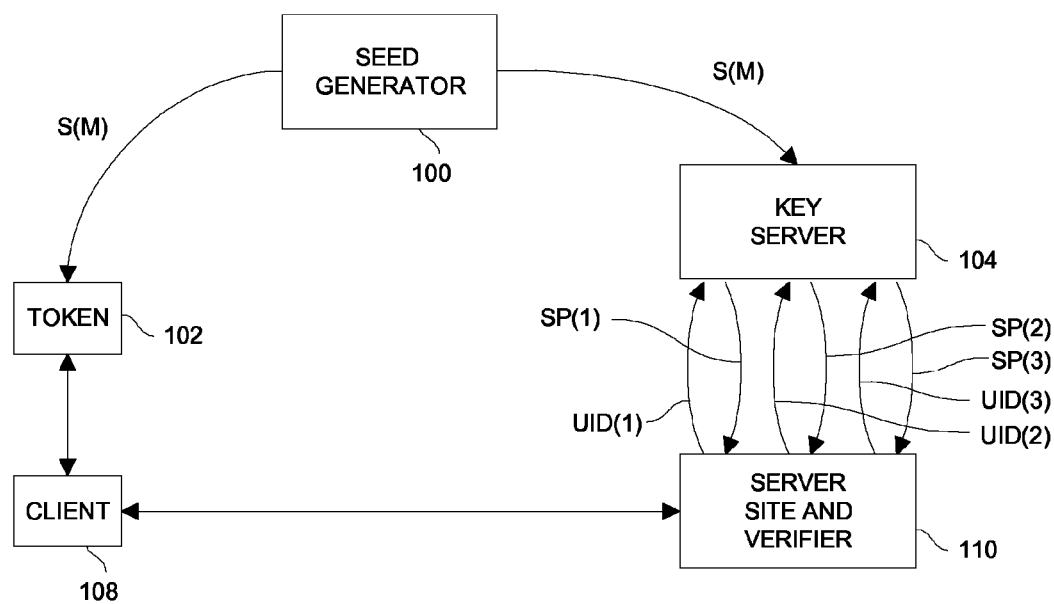
FIG. 1 is a block diagram of a system that generates derivative seeds for a group of users.

In an earlier patent application owned by the assignee of record (i.e., U.S. Ser. No. 09/304,775 filed May 4, 1999, now U.S. Pat. No. 6,985,583, incorporated herein by reference), an approach was disclosed for using a single master seed or secret to generate multiple verifier or derivative seeds, each one for authenticating to a different site. This allows an entity to authenticate to many verifiers without having to manage a large number of secrets. With this technique only a single secret needs to be maintained and management becomes much simpler as compared to an approach that requires a different secret for each site. With one secret the user can authenticate to multiple sites or multiple verifiers without compromising the secret or having to share it with more than one entity. The process works as follows.

During a registration process, Site 1 asks the user to enter the serial number for the token. Site 1 then sends to a master seed generator both the serial number of the user's token and the unique identifier for Site 1, namely, $UID_1$.

The master seed generator mathematically combines the master seed and the unique identifier $U_{V_1}$ to produce a derivative or verifier seed, $S_{D1}$, which is unique for that particular token being used at that particular site. The derivative seed $S_{D1}$ is generated by using a key derivation function to combine the master seed with other information. The key derivation function has the characteristic that a third party cannot feasibly determine the master seed by knowing the verifier seed and the other information. The other information is identifying information about the authentication server, in this case the unique identifier, $UID_1$.

The master seed generator sends the derivative seed to Site 1, where it is installed into an authentication server or verifier.

During an actual authentication, the authenticator at Site 1 sends its unique identifier $U_{ID1}$ to the token or the user in some other way (e.g. keypad entry) supplies the identifier. The token internally combines $UID_1$ and the master seed to produce another copy of the derivative seed $S_{D1}$. The derivative seed $S_{D1}$ is then used to authenticate to the authentication server. This is typically done by cryptographically combining it with some dynamic variable (e.g. time, a counter variable, a challenge, etc) to produce an authentication code, which is a function of at least the dynamic variable and the derivative seed. This authentication code is then sent to the authentication server for Site 1. Since the authentication server knows the derivative seed and the dynamic variable, it can validate the code, i.e., it can compute the code and compare it to the received authentication code to confirm that the user knows the shared secret.

The same process happens at Site 2, except with a different unique identifier $UID_2$ for that site. The result is a different derivative seed, $S_{D2}$. As a consequence, the resulting authentication codes will be different when using the same token to a different site.

$UID_1$ and $UID_2$ are intended to be unique identifiers associated with each site. These could be the hash of the site URL, for example, or some other unique value such as the public key associated with the site, or perhaps a unique identifier initially selected at random. Once assigned, however, the unique identifier must be knowable to both the master seed generator, and the token so that each can independently compute the same derived seed.

Notice that the master seed is known only by the master seed generator and is the token into which it is programmed. The token never reveals its master seed, and the master seed generator never releases the master seed to anyone. Thus, the master seed itself is never used for authentication.

Multiple People

It was recognized that a problem arises any time one wants to use a symmetric key or a seed based token for multiple different users. For example, assume that multiple family members want to log into the same site (e.g. MSN or AOL) with their own accounts. If each member of the family shared the same token, that generates a need to manage multiple keys, one for each user of the token for whom authentication is to be performed. But provisioning and administering multiple master seeds in a shared token can become very complex. Additionally, each master seed consumes storage memory in the token and some mechanism must be provided enabling the user to select the correct master seed when authenticating. Whereas, the alternative of issuing multiple individual tokens, a different one for each user, would be cumbersome.

It was further recognized that to solve the problem that presents itself under these circumstances, one could instead generate multiple derived seeds enabling multiple different users to authenticate to the same site, wherein each derived seed is used by a different user. In that way, the same master seed can be used to generate a corresponding different derived seed for each member of a group of multiple members. In this case, the master seed is shared between the key server and a token held by the user. Each member of the group of people who will use the token has a corresponding unique identifier which is shared with the key server. The unique identified is a value associated with that member, e.g. the hash of that person's name. The key server generates the corresponding derived seed for each member of the group by mathematically combining the master seed with that member's unique identifier and sends those derived seeds to the verifier site. When a person who is member of the group wishes to authenticate to the verifier site, that person passes his or her unique identifier to the token and the token generates the derived seed for that person by mathematically combining the master seed with a unique identifier for that person. In that way, each member of the group has his or her own key and can authenticate to the verifier site independently of the other members of the group; but only one master seed is required to support this.

In this case, the unique identifiers are associated with the user, as opposed to the sites to which the user is authenticating. The unique identifiers could be anything that uniquely identifies that user, e.g. the hash of ones ISP login name, or possibly the hash of ones Instant Messenger buddy name.

FIG. 1 shows an example of a system in which the derivative seed concept is implemented. It includes a master seed generator 100 which generates and installs a master seed $S_M$ into a token 102 that is used by a group of users. Token 102 is a hardware device implemented, for example, as a credit-card sized device that incorporates a microprocessor with memory and associated hardware logic and firmware, a battery, and an LCD display. In the described embodiment, token 102 accepts data input from, for example, buttons, a keypad, a pressure-sensitive display, through a connector interface or by wireless communication. Token 102 may also be implemented as a software application which runs on a computer, cell phone, personal digital assistant, or any other device capable of executing a software application.

Master seed generator 100 also provides the same master seed $S_M$ for that group of users to a key server 104. Key server 104 may be exclusively a seed distribution server, or it may be a data server, such as a file server, web server, or authentication servers that incorporates seed distribution functionality.

The master seed $S_M$ is a secret that is shared by token 102 and key server 104. Typically, the master seed is generated randomly, for example, by a pseudorandom number generator or by using a sensor observing a sufficiently random physical event. In any case, it is generated in a way that produces a secret number that is statistically difficult to predict.

There is also a client computer 108 that is used by the group of users to authenticate into a server site than includes a verifier or authentication server 110. The process of generating the derivative seeds works as follows.

Initially, master seed generator 100 distributes a master seed to token 102 and to key server 104.

A user at client computer 108 logs into the server site and seeks to register with the particular service provided by that site. As part of the registration request, client computer 108 supplies the serial number of the token being used as well as an identifier $UID_1$ that uniquely identifies the user (e.g. login name or screen name). The serial number of the token will enable key server 104 to find the relevant master seed $S_M$ for that token among the seed records which it stores in a local database.

In response, authentication server 110 at the site sends a registration request to the key server. Accompanying the request is the serial number of the token and the unique identifier for that user. Key server 104, using the serial number, looks up the record for that token in its database and retrieves the corresponding master seed, $S_M$. It then mathematically combines the master seed with the unique identifier to generate a derivative seed, $S_{P1}$, which it sends back to authentication server 110 as part of a seed record. Authentication server 110 stores the received seed record along with its derivative seed $S_{P1}$ in its database for future use in authenticating the user.

In the described embodiment, key server 104 generates the derivative seed $S_{P1}$ by using a key derivation function "KDF." Key derivation functions are well known in the field of encryption. Key derivation functions are generally chosen for a capability to generate relatively distinct outputs for different inputs, and because they are hard to reverse, meaning that it is difficult, given a particular output, to determine the input. Various key derivation functions are based on hash functions, pseudorandom functions, and so on.

Key derivation functions typically combine the secret with other information. The secret may be a password. For the method of the invention, the secret is the seed, either the master seed or a previously generated derivative seed. An iterative function also may be included in a key derivation function. A number, referred to as an iteration count, can be used to indicate how many times to perform an underlying function by which the key is derived. The incorporation of the iteration count into the key derivation function increases the effort required to derive an encryption key from a password. A modest number of iterations, for example, 1000 is not likely to be a burden for legitimate parties when computing a key, but it will be a significant burden for attackers. If the password value is a large random value, a small iteration count may be used. Using a KDF and an iterative function is an example of how to derive the derivative seeds. Other techniques may be used.

It should be understood that other key derivation functions would be similarly useful, and various substitutions for the user information and other information are possible, as required by the particular key derivation function. Key derivation functions based on underlying hash functions, block ciphers, message authentication codes, and so on are among other alternatives.

In the described embodiment, which employs the key derivation function, the inputs to the key derivation function are thus the master seed, the user identifier (or a concatenated version thereof), and a time identifier. The user identifier $U_{ID}$ includes information about the user, and also can include other information, such as a time value.

The key derivation function KDF takes as inputs the master seed $S_M$ and identifying information $UID_1$ for user$_1$. The server 110 stores the master seed $S_M$. Token 102 also stores the master seed $S_M$ and has access to the user identifier information $UID_1$. Token 102 is thus also able to use the same key derivation function to obtain the same derivative seed $S_{P1}$, from the master seed $S_M$ and the user identifier information $UID_1$.

Each user sharing that token will have unique identifier information. The same procedure is followed to generate a corresponding derivative see $S_{Pi}$ for each user, which is stored by authentication server 110.

Whenever any user within the group uses the token to authenticate to the site server, the client will pass the unique identifier for that user to the token. The token will internally combine that user's unique identifier with the previously stored master seed to generate a derived seed unique to that user. The client then uses the derived seed to authenticate the user to the authentication server at the site server site. In one embodiment, the token uses the derived seed to compute authentication code(s) unique to that user. The token passes the authentication code(s) back to the client, which then supplies them to the site server to authenticate the user.

Notice that the actual authentication uses the derivative seeds and never the master key, thereby protecting the security of the master seed. Authentication is typically accomplished by token 102 and/or client computer 108 transmitting a value that is mathematically derived from the derivative seed $S_{Pi}$ to the verifier. Authentication can be accomplished by using a hash function, block cipher, message authentication code, or other techniques. Authentication can be accomplished by using a time-based algorithm according to which, the derivative seed $S_{Pi}$ is, as part of the derivation, combined with time-dependent information. As another example, a challenge/response approach can be used. It would involve the verifier 108 transmitting a challenge value to the token 102. Token 102 then encrypts the challenge value with the derivative seed $S_{Pi}$, and transmits the result back to authentication server 110. Still other approaches include a counter-based authentication and an event synchronous authentication (e.g. HOTP).

Various authentication and communication systems and methods that can be utilized when a secret is shared by a device 102 and a verifier 108 can be extended to use the derivative seed. For example, see U.S. Pat. Nos. 4,720,860; 4,885,778; 4,856,062; 4,998,279; 5,023,908; 5,058,161; 5,097,505; 5,237,614; 5,367,572; 5,361,062; 5,485,519; and 5,657,388, which describe various systems and methods for authentication using shared secrets. Such systems can incorporate the system and methods described herein to use a derivative seed as the basis for authentication.

A common feature of the approaches just described is that there is only a single master seed in the token and the token uses that master seed to generate whatever derivative seeds are required. As indicated above, this has the great advantage of not requiring the user to manage multiple master seeds, which can be confusing and difficult to many users. Also note that the token typically neither receives nor even stores the derivative seed. However, in certain embodiments, the token may receive and/or store the derivative seed. It generates the derivative seed as needed from that single stored master seed and, when it is done using the derivative seed for authenticating to the desired site, it typically erases that derivative seed.

An alternative approach is, of course, to pre-compute and store the various derivative seeds in the token and simply supply the appropriate derivative seed when required.

A further extension of the idea presented above uses multiple unique identifiers to produce a derivative seed. For example, if multiple individuals in a group share a token and they want to use that same token to authenticate to different sites, then, derived seeds are generated for each meaningful combination (of person and site) that might be appropriate. To simplify the example, assume that there are two members in the group and also assume that each member of the group wants to use the token to authenticate to each of two sites, e.g. AOL and MSN. In that case, four derivative seeds are defined for the system, one for each combination of person and site. Thus, for person A at site 1 the corresponding derivative seed for that combination is generated by applying the unique identifier for person A ($UID_A$) to the master seed ($S_M$) to generate an intermediate result $S_A$ and then applying the unique identifier for site 1 ($SiteID_1$) to the intermediate result to generate the derivative seed, $S_{A1}$.

$$S_A = KDF(S_M, UID_A)$$

$$S_{A1} = KDF(S_A, SiteID_1)$$

The rest of the derivative seeds are generated in a similar fashion by using first the UID for the person and then the unique ID for the site. While the above example shows the derivation of $S_A$ and $S_{A1}$ as serial computations (one after the other), this is an example only and is not required. In other embodiments, a single KDF may be performed using multiple unique identifiers.

This can be extended to any combination of entities. In other words, multiple unique identifiers can be combined when creating a derivative seed. For example, person A might want to authenticate to computer X and at site 1. Or, person A might want to authenticate to computer X at site 2. Or, person B might want to authenticate to computer Y at site 2, etc. There would be a different derivative seed for each of these combinations. And that derivative seed would be generated from the master seed by sequentially applying the unique identifier for person, the unique identifier for the computer, and the unique identifier for the site.

Any number of unique identifiers can be chained in this fashion to generate a corresponding derivative seed from a single master seed. Moreover, as in the simpler cases described above, the token would not need to store the derivative seeds so long as it was provided with the correct unique identifiers at the time of authentication to produce the required derivative seed. The token only needs to store the master seed and the function which is used to generate the derivative seed from the master seed.

In addition to sites and people, the unique identifiers can be virtually anything that identifies the entity wanting to be authenticated or the identity entity into which one wanted to authenticate. This includes, for example, a hardware unique ID; a unique domain ID; a group ID; an intermediary node ID; a newsgroup ID; a Kazza ID; a drivers license number; a passport number; a telephone number; the serial number of a cable box; etc. The intermediary node ID may be useful for antiphishing techniques (i.e. $user_A$ at $site_B$ coming from $site_C$).

Figure 2:
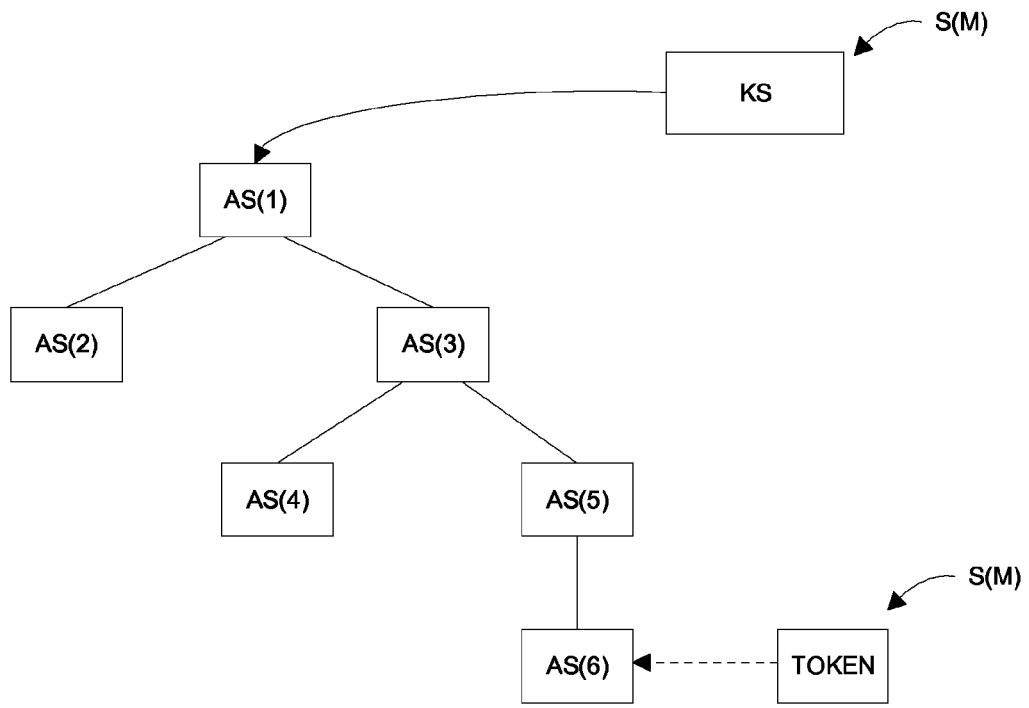
FIG. 2 is a block diagram that illustrates another aspect of how derivative seeds are generated and used.

Another example of a further extension of these ideas is illustrated in FIG. 2. This particular example shows how multiple unique identifiers can be used to enable local authentication within a network thereby avoiding having to go back to a root authentication server for every authentication.

In FIG. 2 there are multiple authentication servers within a network arranged in a tree structure. The root authentication server is $AS_1$ and the remainder of the authentication servers, $AS_2$, $AS_3$, $AS_4$, $AS_5$, and $AS_6$ are connected to the root authentication server through the tree structure, as shown. Using the concepts described above, authentication is performed locally by the server to which the client connects and all of the authentications are based on the single master seed in the token held by the user.

A key server, KS, which stores the master seed, $S_M$, generates a derivative seed, $DS_1$, and sends that derivative seed to the root server, $AS_1$. The derivative seed is generated as previously described by mathematically combining the master seed $S_M$ with a unique identifier for the root server $AS_1$ (i.e., $UID_1$) by using some appropriate key derivation function of a type known to persons of ordinary skill in the art. The user who possesses a token containing a copy of the master seed, $S_M$, can authenticate directly to the root server, $AS_1$. This is done by receiving from the root server $AS_1$ its unique identifier, $UID_1$, and applying that unique identifier to the master seed $S_M$ to generate the corresponding derivative seed, $DS_1$.

$$DS_1 = KDF(S_M, UID_1)$$

This operation can also be represented as follows: $DS_1 = S_M + UID_1$. The user then uses this derivate seed, $DS_1$, to authenticate directly to the root server in the manner described above.

In the described embodiment, a derivative seed $DS_3$ is generated for a next authentication server in the tree, $AS_3$, by applying its unique identifier to the derivative seed for $AS_1$. In other words, root server, $AS_1$, generates the derivative seed, $DS_3$, for authentication server, $AS_3$, by applying $UID_3$ to $DS_1$. That is, $$DS_3 = KDF(DS_1, UID_3)$$

Using the other form, this could be written as: $DS_3 = DS_1 + UID_3$.

Notice that if the appropriate key derivation function is chosen, $DS_3$ can also be generated from the master seed by applying the two unique identifiers in succession, i.e., $$DS_3 = (S_M + UID_1) + UID_3.$$

In other words, the derivative seed for $AS_3$ can be generated by two different entities. (It should be noted that not all key derivation functions allow separating the steps as just shown. An appropriate key derivation function must be used in order to take advantage of this particular characteristic.) The derivative seed can be generated by the key server, KS, based on the master seed, $S_M$, if the unique identifiers for the root server, $AS_1$, and for authentication server, $AS_3$, are made available to the key server. Or, if the unique identifier for authentication server, $AS_3$, is made available to authentication server, $AS_1$, it can be generated by authentication server, $AS_1$, based on its derivative seed $DS_1$.

This approach can be extended to the other authentication servers in the tree structure to generate derivative seeds for the other servers. Thus, each authentication server is able to generate derivative seeds for a neighboring child server in the network tree.

In the described embodiment, the neighboring authentication server which generates and supplies the derivative seed to the requesting server also sends along with the derivative seed its own unique identifier and the unique identifiers of all of the authentication servers in the path back to and including the root server. Thus, any authentication server that wants to authenticate a user is able to provide to that user (or the user's token) all of the unique identifiers that will enable the token to generate the derivative seed for that authentication server from the master seed, $S_M$, which it stores internally. This makes it unnecessary for the authentication server, regardless of where it is in the tree, to communicate with parent servers further up in the tree to perform authentication. Thus, for example, if the user wants to authenticate to server $AS_6$, it receives from server $AS_6$ the unique identifiers for $AS_1$, $AS_3$, $AS_5$, and $AS_6$. Then, by using the appropriate key derivation function which the user's token stores internally it applies those unique identifiers in succession to the master seed $S_M$ to compute the derivative seed for server $AS_6$.

Disconnected Authentication

Figure 3:
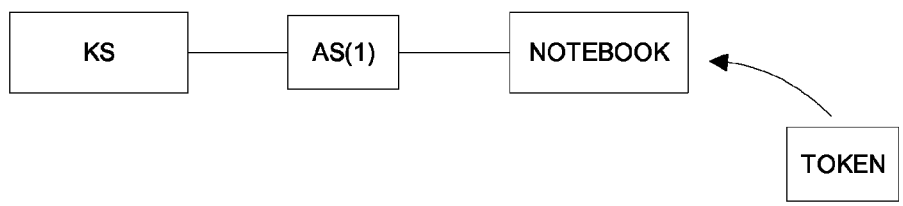
FIG. 3 is a block diagram used to described disconnected authentication.

Another advantage to the ideas described above is that the generation of the derivative seed can take place anytime and need not occur at the time the derivative seed is generated for other servers or entities in the system. The usefulness of this can be appreciated with the aid of a simple example illustrated by the network shown in FIG. 3. The network includes a key server KS, an authentication server AS at Site 1, a notebook computer NB connected to Site 1, and a user's token.

As described above, authentication server AS at Site 1 registers with the key server KS by providing its unique identifier, $UID_1$ to key server KS. Key server KS, in turn, uses a key derivation function to combine its master key, $S_M$, with the unique identifier, $UID_1$, to generate a derivative seed, $DS_1$, for Site 1. The user of the notebook computer authenticates to Site 1 by using a token which also holds a copy of the master seed $S_M$. To enable the user to authenticate to Site 1, the authentication server at Site S1 provides its unique id, $UID_1$, to the notebook computer, which, in turn, provides that unique id to the token. The token, which also knows the relevant key derivation function and the master seed $S_M$, then computes $DS_1$ in the same manner that key server KS generated it and uses that derivative seed to authenticate to authentication server AS.

At some later time, the user may want to disconnect the notebook from Site 1 so that it no longer is able to communicate with the authentication server $AS_1$ at Site 1. It may be desirable under those circumstances to require the user to authenticate to the notebook computer while it is disconnected and during the period when authentication to the authentication server at Site 1 is not possible. This is accomplished by using the ideas discussed above. More specifically, the user registers the notebook computer NB with the authentication server $AS_1$ at Site 1 for disconnected authentication. In response, the authentication server $AS_1$ at Site 1 performs another seed derivation by mathematically combining a unique id, $UID_{NB}$, from the notebook computer (e.g. its serial number) with the derivative seed that was previously provided to the authentication server, namely, $DS_1$. In other words, the authentication server $AS_1$ at Site 1 computes the following: $DS_2=DS_1+UID_{NB}$. Then, the authentication server sends derivative seed, $DS_2$, along with its unique identifier, $UID_1$, the notebook computer before the notebook is disconnected.

To enable the user to authenticate to the notebook computer while offline, the notebook computer sends to the user's token its own unique identifier, $UID_{NB}$, as well as unique identifier for Site 1, namely, $UID_1$. Internally, the token uses the key derivation function to mathematically combine the master seed $S_M$ and the two identifiers, $UID_1$ and $UID_{NB}$, to generate $DS_2$ (i.e., $DS_1=S_M+UID_1$; $DS_2=DS_1+UID_{NB}$). The user then uses $DS_2$ to authenticate to the notebook while it is disconnected from the network.

The above-described processes involving a network of authentication servers and disconnected authentication can be extended to many levels and to different levels by simply applying the principles that were also presented above.

Note that the unique identifier can be any value. While the unique identifier can be any value, for the highest level of security, the value is unique. Examples of unique identifiers include the public key of a site, a site URL, a username, a notebook serial number, etc. The combining of the unique identifier and the master seed can occur with a variety of different algorithms known in the art. Hashing them together is one example. Also, the authentication token can be any type of token based on a shared secret (symmetric key or seed). Examples include time-based, challenge-response, time and event, event synchronous, etc. Also, as is well known by persons skilled in the art, other information can be included in the derivation of the seed.

It should be understood that certain functionalities which are shown in this application as separate may be combined, and other functionalities that are shown as being combined may be split without impacting the underlying principles described herein. For example, master seed generator 100 and key Server 104 are shown in FIG. 1 as being separate entities. These two functions could, however, be combined into a single entity. Also, server site 110 was shown as including the functionality of the verifier or authentication manager; but these two functions could be separated with the authentication manager being managed by a different entity from the one that manages the server site. Indeed, given that the authentication service is more likely to be provided by a third party server site rather than the site into which the user is trying to gain access, the functionality would be separated.

It should also be understood that the entity that is authenticating into a site was referred to herein as the user. In fact, this entity might be more generally referred to as the client-side entity since it could also be any hardware device, application or other software entity that seeks to authenticate into another site. Similarly, the servers into which the client-side entities seek to authenticate could be server sites, domains, regions or any other server-side entity into which a client-side entity might wish to authenticate.

In the above description, the user device that carries the master seed and is used to authenticate to a server was referred to herein as a token. This device is also sometimes referred to as an authenticator. It could take various forms including, for example, a hardware device which includes an internal processor element and memory or it could be code running on a PC (e.g. a soft token).

Also note that the user must have the ability to store the master see and must have key derivation capability, and must know the key derivation function. This capability can be contained with the token employed by the user in connection with the client computer or it can be contained within a combination of those devices.

Other embodiments are within the following claims.

What is claimed is:

1. A method for use in a network in which a user having a user device that stores a master seed authenticates through a client-side device to another entity on the network, the client side device being located between the user device and the other entity, the method comprising: in the other entity, receiving from the client-side device a unique identifier identifying the client-side device; in the other entity, mathematically combining a secret with the unique identifier for the client device to generate a derivative seed, wherein the secret is derived from the master seed; sending the derivative seed from the other entity to the client-side device; and in the client-side device: receiving the derivative seed; and after receiving the derivative seed, disconnecting the client-side device from the network; wherein the method further comprises, in the user device: receiving the unique identifier for the client-side device; mathematically combining the at least the unique identifier for the client device with the secret to generate the derivative seed; and using the derivative seed to authenticate the user device to the client-side device while the client-side device is disconnected from the network, the client-side device being unable to communicate with the other entity while the client-side device is disconnected from the network.

2. The method of claim 1, wherein the client-side device is a portable computer and the user device is a hardware token.

3. The method of claim 1, wherein the secret is a master seed.

4. The method of claim 1, wherein the secret is a derived seed that is generated by mathematically combining a master seed with one or more other identifiers.

5. The method of claim 1 wherein the method further comprises:
   sending a unique identifier for the other entity from the other entity to a key server;
   in response to sending the unique identifier for the other entity from the other entity to the key server, receiving, at the other entity, the secret from the key server, the secret representing a cryptographic combination of the unique identifier for the other entity with a master seed stored on the key server;

sending the unique identifier for the other entity from the other entity to the client-side device; and receiving, at the user device, the unique identifier for the other entity from the client-side device.

6. The method of claim 5 wherein mathematically combining at least the unique identifier for the client device with the secret to generate the derivative seed includes cryptographically combining, at the user device, the master seed with the unique identifier for the other entity to generate the secret.

7. A method performed by a client-side device on a network in which a user authenticates through the client-side device to another entity on the network, the method comprising:

sending to the other entity of the network a unique identifier identifying the client-side device;

receiving from the other entity a derivative seed, wherein the derivative seed was generated by mathematically combining a secret with the unique identifier for the client-side device, wherein the secret is based on a master seed;

disconnecting from the network, the client-side device being unable to communicate with the other entity while the client-side device is disconnected from the network;

to authenticate a user, sending the unique identifier for the client-side device to a user device;

after sending the unique identifier for the client-side device to the user device, while the client-side device is disconnected from the network, receiving information from the user device indicating that user device possesses the derivative seed; and determining that the user is authenticated to the other entity in response to receiving the information from the user device indicating that user device possesses the derivative seed.

8. The method of claim 7, wherein prior to the step of receiving information from the user device indicating that user device possesses the derivative seed, the user device generating an authentication code in response to the derivative seed, and wherein the information from the user device is the authentication code.

9. The method of claim 7, wherein the secret is mathematically computed from the master seed.

10. The method of claim 7 wherein the secret represents a cryptographic combination of a unique identifier for the other entity with the master seed, the master seed being stored on a key server but not on the other entity or the client-side device.

11. The method of claim 7 wherein the client-side device is a portable computer and the user device is a hardware token.

* * * * *